United States Patent
Bhattacharyya et al.

(10) Patent No.: US 10,169,118 B2
(45) Date of Patent: *Jan. 1, 2019

(54) REMOTE PRODUCT INVOCATION FRAMEWORK

(71) Applicant: International Business Machines Corporation, Armonk, NY (US)

(72) Inventors: Anamitra Bhattacharyya, Littleton, MA (US); Ann M. Fred, Research Triangle Park, NC (US); Hari H. Madduri, Austin, TX (US); Thomas J. Sarasin, Littleton, MA (US); Susan F. Wenzinger, Research Triangle Park, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 71 days.

This patent is subject to a terminal disclaimer.

(21) Appl. No.: 15/284,308

(22) Filed: Oct. 3, 2016

(65) Prior Publication Data
US 2017/0024265 A1    Jan. 26, 2017

Related U.S. Application Data

(63) Continuation of application No. 12/169,919, filed on Jul. 9, 2008, now Pat. No. 9,471,406.

(51) Int. Cl.
*G06F 9/44* (2018.01)
*G06F 9/54* (2006.01)
*G06F 9/50* (2006.01)
*G06F 8/71* (2018.01)

(52) U.S. Cl.
CPC ............. *G06F 9/547* (2013.01); *G06F 8/71* (2013.01); *G06F 9/5055* (2013.01); *G06F 9/541* (2013.01); *G06F 2209/509* (2013.01)

(58) Field of Classification Search
None
See application file for complete search history.

(56) References Cited

U.S. PATENT DOCUMENTS 6,378,002 B1 *  4/2002  Brobst ................... G06F 9/465
                                                                    719/315
9,471,406 B2 * 10/2016  Bhattacharyya ...... G06F 9/5055
(Continued)

*Primary Examiner* — Kenneth Tang
(74) *Attorney, Agent, or Firm* — Fabian VanCott; Steven L. Nichols

(57) ABSTRACT

A method for remote product invocation includes configuring an invocation framework that includes an integration module and an endpoint/handler module. Once configured, the integration module is configured to: receive a source object; format data from said source object for a desired operation; and utilize said endpoint/handler module to make a connection to an external service that executes said desired operation using said data from said source object. A system for remote invocation of external services includes a calling entity which generates a source object containing data for execution of a remote operation; and an integration module configured to receive the source object, interpret the source object, and pass the data to an endpoint/handler which opens a connection with an external service and executes the remote operation.

20 Claims, 4 Drawing Sheets

(56) References Cited

U.S. PATENT DOCUMENTS

2004/0064503 A1\* 4/2004 Karakashian ........... G06F 9/541
     709/203
2007/0226145 A1  9/2007 Ishigaki et al.
2009/0328067 A1\* 12/2009 Srinivasan ................ G06F 8/30
     719/316

\* cited by examiner

REMOTE PRODUCT INVOCATION FRAMEWORK

BACKGROUND OF THE INVENTION

Aspects of the present invention relate in general to computer processing and, more specifically, to the automation of tasks within computer systems.

In modem computer systems a number of applications and services are often combined to fulfill a user's needs. In many cases, the applications and services may use different data formats, communication protocols, and logic. The interoperability between these applications and services depends on the system's ability to translate between these different data formats, make the desired connections between the applications, and access the logic of the various services. As business or other needs arise, the users of the computer system may desire to create responsive combinations of various applications or services that are not natively compatible.

BRIEF SUMMARY OF THE INVENTION

A method for remote product invocation includes configuring an invocation framework that includes an integration module and an endpoint/handler module. Once configured, the integration module is configured to: receive a source object; format data from said source object for a desired operation; and utilize said endpoint/handler module to make a connection to an external service that executes said desired operation using said data from said source object. A system for remote invocation of external services includes a calling entity which generates a source object containing data for execution of a remote operation; and an integration module configured to receive the source object, interpret the source object, and pass the data to an endpoint/handler which opens a connection with an external service and executes the remote operation.

BRIEF DESCRIPTION OF THE SEVERAL VIEWS OF TIE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
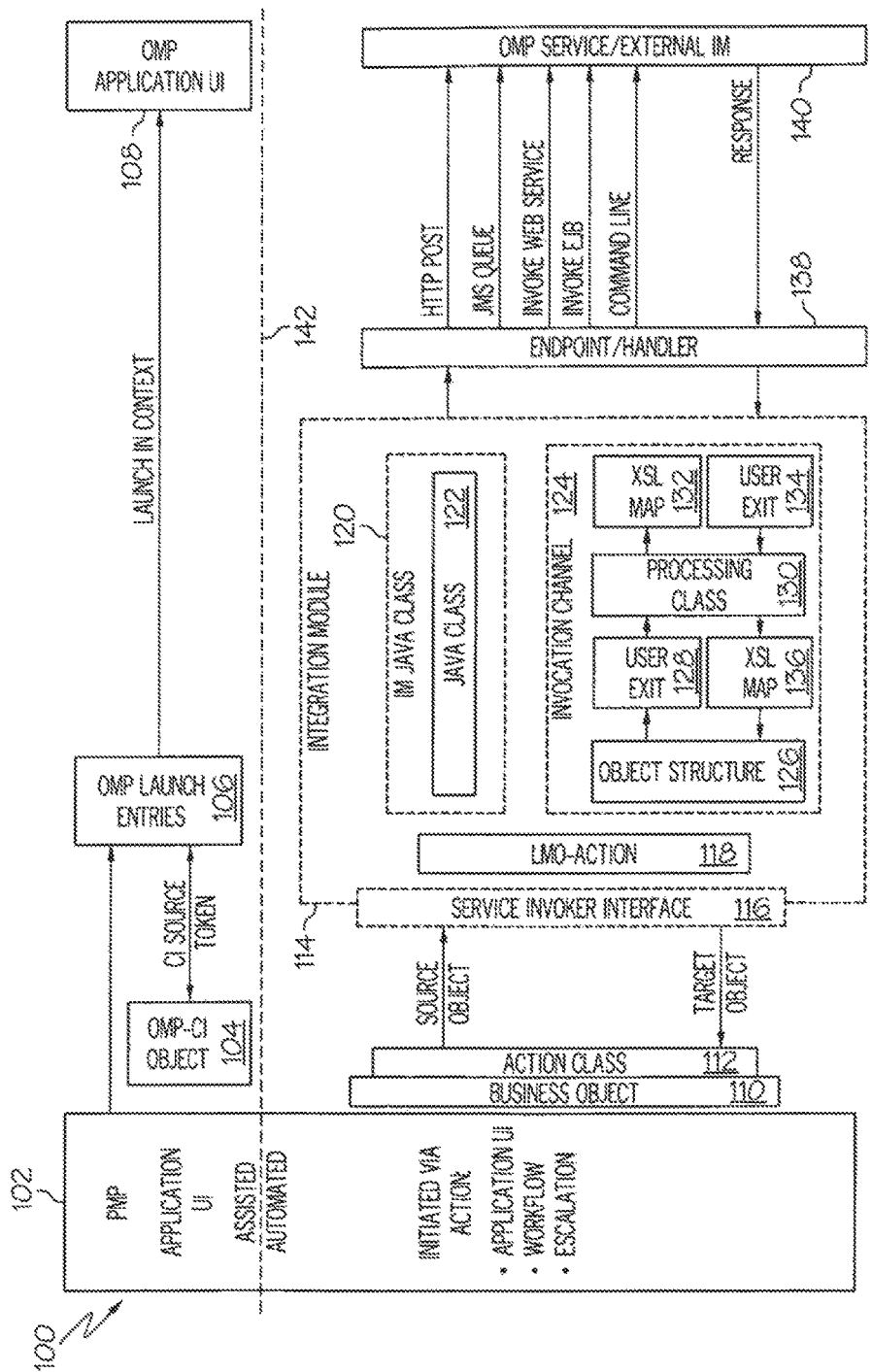
FIG. 1 is an illustrative diagram of a product invocation framework, according to one embodiment of principles described herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a diagram showing an illustrative remote product invocation framework (100). The remote product invocation framework (100) is designed to allow a calling entity to invoke an external service to perform an operation. In the example shown in FIG. 1, the remote product invocation framework (100) includes a process management product (102) invoking an Operational Management Product (OMP) service (140) or an OMP application user interface (108).

The process management product (102) automates and integrates information technology (IT) management processes for rapid responsiveness and greater flexibility. Particularly, process management products (102) may be configured to automate specific tasks by utilizing existing OMP services (140).

An OMP service (140) may be contained within a larger external application or product. The OMP service (140) automates tasks when called from an application or business processes. Examples of operational management products that include OMP services (140) are: application management products which assist in monitoring systems, addressing transactional performance problems, backup/recovery, etc. Other operational management products may include server, network and device management; security management; and storage management solutions.

The process management product (102) may invoke an operational management process in two basic ways: assisted invocation or automated invocation. FIG. 1 is divided by a dashed line (142). The portion of the diagram above the dashed line (142) illustrates assisted invocation, while the portion of the diagram below the dashed line (142) illustrates automated invocation.

Assisted invocation uses an "OMP launch entries" module (106) and an Operational Management Product-Configuration Item (OMP-CI) object (104) to launch an OMP application user interface (108) in the context of a configuration item. A Configuration Item (CI) is any component of an information technology infrastructure that is under the control of configuration management. In this case, the configuration item (CI) is contained within the OMP-CI object and contains data that relates to properly launching the OMP application user interface (108). The assisted invocation method allows a human operator to access and manipulate the OMP application user interface (108) to accomplish a desired task.

On the other hand, automated invocation uses an integration module (114) in combination with an endpoint/handler (138) to bridge the gap between the process management product (102) and an OMP service (140). A properly developed process management product (102) can interact with various integration modules (114) as they are plugged/unplugged in the invocation framework (100) without any changes to the process management product (102). This could include new integration modules being added or existing integration modules that are being upgraded/enhanced.

A variety of methods can be used to initiate an automated invocation. By way of example and not limitation, the automated invocation may be initiated by an application User Interface (UI), a workflow, or an escalation. A simple hypothetical situation illustrates the usefulness of a remote product invocation framework (100) bridging the gap between a process management product (102) and an operational management product (140). In this hypothetical example, an automated workflow wants to print an image onto paper. The IT infrastructure includes three printers from various manufacturers. Each of these printers has varying capabilities, communication protocols, and data format requirements. The process management product (102), which may be initiated by the automated workflow, creates a "print" business object which is passed through the remote product invocation framework (100).

The remote invocation framework (100) consists of various modules which interpret the business object, determine which operational management product service is best suited to execute the business object, format the data within the business object to be compatible with the selected operational management product service, open a connection with the operational management product service, and transmit the formatted request and data to the operational business management product for execution. In our example, the remote product invocation framework (100) selects a printer to execute the print job, formats the print command and image data so that they are compatible with the selected printer, opens a connection to the printer, and passes the formatted information to the select printer for printing.

The example above is simplified in many respects to better communicate the role of a remote product invoker framework (100). Additionally, many of the services needed by a process management product (102) may likely require significantly more complex functionality within the remote product invoker framework (100). For example, if a software patch is to be distributed to all machines within an organization that have a specific operating system, the process management product (102) may generate a "patch" business object which contains the patch software and other needed data. In this example, the remote product invocation framework (100) would then determine which machines require the update and what method should be used to install the update on each target machine. If the remote product invocation framework (100) determined that an appropriate installation service existed on each machine, it would gather the required credentials to access the target machines, and format the data as required for each target machine, open the connections to the target machines and pass the data to the installation service. If a response was required (such as "installation complete"), the remote product invocation framework (100) would accept the response data, format it, and route it back to the appropriate process management product (102).

According to one illustrative embodiment, the remote product invocation framework (100) is comprised of an action class (112), an integration module (114) and an endpoint/handler (138). The action class (112) may be embedded within the process management product (102) as a Java class or other code. Where a variety of integration modules are available serving different purposes and objectives, the action class (112) contains logic that determines which integration module (114) to call. The remote product invocation framework (100) provides functionality available to the action class (112) to facilitate the lookup of available integration modules (114). This look-up capability is driven by the available integration modules supporting the desired logical management operations for a specific operation management product (140). The action class (112) then passes the business object (110) to the selected integration module (114).

As indicated above, after the desired processing of the business objection (110) has been completed by the OMP (140), a response may be returned by the OMP (140). The action class (112) also determines the appropriate method of handling the response (if any). For example, a response may be returned as a target business object. The action class (112) receives the target business object and determines if it should be displayed, stored on a database, if a status field should be updated, or if other action should be taken.

The integration module (114) is comprised of a number of elements including a service invoker interface (116), a logical management operation (118), an Integration Module (IM) Java class (120), and an invocation channel (124).

The service invoker interface (116) defines the content and format of data passed between the action class (112) and the integration module (114). According to one illustrative embodiment, the service invoker interface (116) specifies one or more method signatures that can be used to pass data from the action class (112) to the integration module (114). By way of example and not limitation, an invocation that complies with a method signature may comprise a source business object, an array of target business objects, a logical management operation, an endpoint, and a hash map.

The logical management operation (118) defines an action or task to be executed upon receipt of the business object. The logical management operation (118) also identifies which object and/or object attributes (input and output) are required to support the action. It acts as the interface between the process management product (102) and the integration module (114). This shields the process management product (102) from the integration module implementation. The logical management operation (118) is a protocol-free way of defining the interface between the process management product (102) generating the business object and the integration module (114) which receives the business object. The service invoker interface (116) defines that interface using a specific protocol (such as a Java interface or Web Service interface).

Logical management operations (118) can be created using an application user interface or by importing eXtensible Markup Language (XML) using the integration framework. Normally, an integration module installation will include creating logical management operation modules (118) via XML. Various integration modules (114) can support the same logical management operation module (118) and vice versa. Out of the different combinations between integration modules (114), logical management operations (118), and operational management products (140), one or more preferred combinations can be selected for the process management product (102) to invoke through an action class (112). A multi-purpose integration module (114) could provide a logical management operation (118) that supports attributes that are common to multiple business objects (110) or process management products (102). Thus, a single integration module (114) could be used by many process management products (102). Additionally, the logical management operation (118) identifies the various response patterns that the integration module (114) supports.

By way of example and not limitation, an integration module (114) may support one or more response patterns including: 'synchronous,' 'asynchronous one-way,' 'asynchronous deferred response,' or 'asynchronous call back.' The 'synchronous' response pattern refers to a remote product invocation framework (100) that is configured to receive a real-time response from the OMP service (140) and pass that response back to the process management product (102). The 'asynchronous one-way' response pattern refers to an invocation where is no response returned to the process management product (102). A third response pattern is 'Asynchronous deferred response' where the process management product (102) issues a request in the form of a business object (110) and the response to that request will be requested by the process management product (102) at a later point in time. The fourth response pattern is 'Asynchronous call back' in which the OMP service (140) returns a response or status update to the process management product (102) at a later time.

The IM Java class (120) and the invocation channel (124) represent alternative logic paths within the integration module (114). The custom Java class (122) is only one illustrative example of executable code modules that could be used within the integration module. According to one exemplary embodiment, the IM Java class (120) is a custom coded logic path, while the invocation channel (124) contains multiple segments of prewritten logic that can be accessed and customized through a user interface. The IM Java class (120) and the invocation channel (124) can contain any logic, formatting, or commands that are not contained in other modules within the invocation framework (100). By way of example and not limitation, an invocation channel (124) may provide condition-based data filtering.

According to one exemplary embodiment, the invocation channel (124) is comprised of an object structure (126), a first user exit (128), a processing class (130), and a first eXtensible Stylesheet Language (XSL) map (132). The logical processing flow of source objects progresses through the invocation channel (124) as shown by arrows in FIG. 1 pointing to the right. The object structure (126) defines one or more objects that make up the content that will be provided by the object structure. For example, an object structure for 'People' could be made up of a 'Person' object and a child object 'Phone.' When the invocation channel (126) for 'People' is called, a 'Person' business object and related 'Phone" objects are passed to the channel and the object structure will build an XML message made up of the 'Person' object and all its related 'Phone' objects (i.e. a person with one or more phone numbers). According to one exemplary embodiment, the source object passed to the channel is the primary (top) business object of the request object structure. The input to the object structure is the top business object, and the output is an XML message containing the content per object structure definition.

In one illustrative embodiment, the first user exit module (128) and second user exit module (134) are Java classes where filtering, data transformation and business logic can be performed. The user exit modules (128, 134) are normally implemented as part of a customer installation/customization. This class has methods for executing prior to and after the processing class (130). The XML message from the object structure (126) is an input to this class.

The processing class (130) is a Java class where filtering, data transformation and business logic can be performed. According to one exemplary embodiment, pre-packaged enterprise resource planning adapters and integration modules may provide processing classes to support their integration functionality.

In one embodiment, the XSL maps (132, 136) are eXtensible Stylesheet Language Transformation (XSLT) style sheets that perform data transformation and/or mapping of the XML message from the input format to an output format. XSL files can be implemented via an application Enterprise ARchive (EAR) file or through an absolute path reference. Using the latter allows XSL to be implemented without rebuilding the EAR file and restarting the application server. The XSL files allow for a 'no code' implementation of the invoker. According to one illustrative embodiment, the XSL maps and other elements within the invocation channel can be accessed through a graphical user interface that allows customization of the invocation channel without any Java coding.

The endpoint/handler (138) makes the actual connection between the integration module (114) and the OMP service (140 According to one exemplary embodiment, the endpoint/handler (138) has two distinct subcomponents, an endpoint and a handler. An endpoint contains a data structure containing information required for the connection to a given resource or service. This information may include the service name and location, the type of connections that can be made with a given service, credentials used in making the connection, a port number, format information, and other like data. In addition to an endpoint, a variety of other data structures may be used to store the relevant information in a retrievable form. By way of example and not limitation, a hashmap could be used to store connection credentials and other data. A hashmap is a data structure that associates keys with values. The hashmap supports lookup. For example, given a key, such as the identity of a remote server, the lookup function finds the corresponding value, such as the username and password associated with the remote server.

The handler uses values collected or contained within the endpoint to make the connection to the OMP service (140). The handler first opens a communication port and conveys the credentials to the OMP service (140) using the correct communication protocol. For example, if the handler were connecting to a remote web server, the handler would open a web service connection and transmit the XML data to the web server. If the credentials are accepted by the remote web server, a connection is established and the desired operation is executed. Handlers may be configured to open a variety of connection types. By way of example and not limitation, the handler may open an "HTTP connection," write the data to a Java Message Service (JMS) queue, invoke a web service connection, invoke an Enterprise Java Bean (EJB), or open a command line interface.

According to one illustrative embodiment, the properties needed by the integration module (114) to communicate with the external service (140) could be configured in an endpoint using an EndPoint application. This EndPoint application can be used for all endpoints regardless of which handler the endpoint implements, thereby providing a standard way to configure connection properties for an external service. The number and types of these properties may vary from handler to handler. In addition to preconfigured handlers provided with an invocation framework, a customer could provide their own handler. In this implementation, the PMP (102) or calling entity invokes the integration module (114) and passes a map of data that provides endpoint property values that would override the pre-configured values. Likewise, the integration module, itself, could also have logic that operates on the data that the integration module (114) receives which overrides the pre-configured endpoint data.

Figure 2:
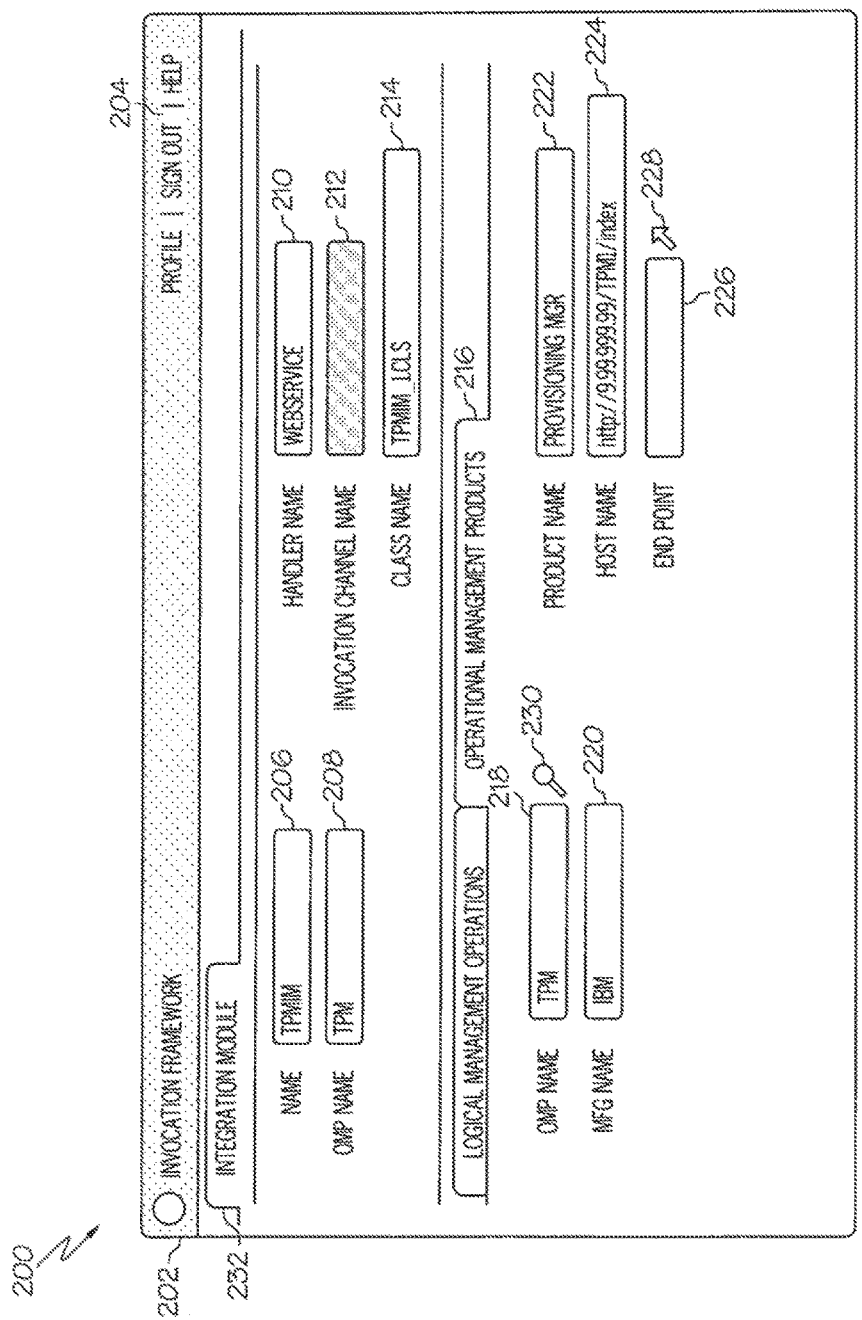
FIG. 2 is an illustrative diagram of an interface for configuring a product invocation framework, according to one embodiment of principles described herein.

FIG. 2 is an illustrative diagram of an interface (200) for configuring a product invocation framework. The interface (200) may be accessed through a variety of methods including through an application hosted on a local computer, through a local area network, or via a wide or global network, such as the Internet. According to one illustrative embodiment, the interface may be an online application that is accessed through a web browser. The interface (200) allows a user to configure an integration module (114, FIG. 1) to accept a source object, make a connection to a designated service, execute the desired operation, and optionally return a target object.

Before using the interface (200), the user may first determine what operation needs to be performed to accomplish the desired task. The user then selects or creates a business object associated with the selected operation. The user then selects an OMP (140, FIG. 1) or other service that performs the desired operation.

The interface (200) may comprise a header (202) which identifies the interface. The header may also contain a number of functions (204) to assist the user. According to one exemplary embodiment, the interface may contain an upper portion (232) which contains information and options for configuring an integration module (114, FIG. 1). The upper portion (232) may contain a number of fields including: a name field (206), an OMP name field (208), a handler name (210), an invocation channel name (212), and a class name (214). The name field (206) allows the user to enter or select a name for the integration module. The OMP name field (208) is configured with an OMP product name if the integration module supports a specific OMP product that will perform the operation. The handler name field (210) allows the user to select a compatible handler that is configured to make a connection to the OMP service. The user may then select either an invocation channel (124, FIG. 1) or the integration module Java class (120, FIG. 1) to be included within the data path. In this illustrated example, the user has selected integration module class "TPMIM_1.cls" which is displayed in the class name field (214). The invocation channel name field (212) is darkened, indicating that no entry is required for an invocation channel.

A second section of the interface (200) provides for more detailed control of elements within various portions of the invocation framework. For example, the lower section may have a number of tabs, each tab being associated with an invocation framework component. In the illustrated example of FIG. 2, the operational management products tab (216) is selected. The operational management products tab (216) may include a number of fields including: OMP name (218), manufacturer name (220), product name (222), host name (224), and endpoint field (226). The OMP name (18) may contain the identical information as the upper OMP name field (208) and identifies the operational management product that is being targeted for use. A magnifying glass icon (230) may be selected to provide additional detail about the operational management product. The manufacturer name field (220) identifies the manufacturer of the operational management product. The product name field (222) identifies the larger scale product of which the operational management product or service is a part. For example, a provisioning manager product may supply a number of services that are available to a process management product. The host name field (224) indicates the location and/or host entity of the operational management product. In the illustrated example of FIG. 2, the location of the operational management product is a designated with a uniform resource locator (URL). The endpoint field (226) identifies the endpoint or other data structure that supplies the appropriate credentials for connecting to the OMP service. An arrow (228) can be selected to open a display of all available and compatible endpoints for connecting to the operational management product. The user can then select the desired endpoint, which will be displayed in the endpoint field (226).

Figure 3:
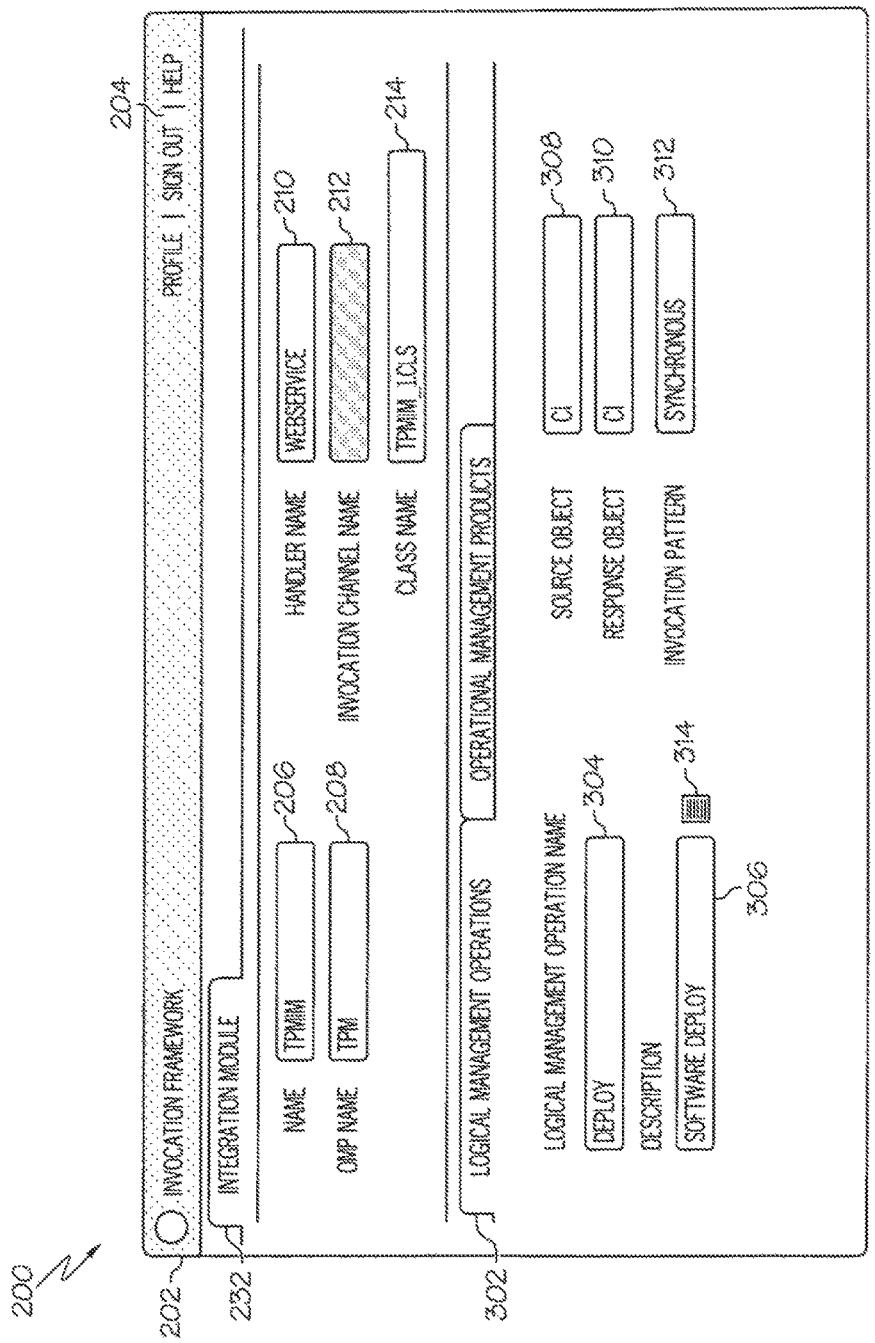
FIG. 3 is an illustrative diagram of an interface for configuring a product invocation framework, according to one embodiment of principles described herein.

FIG. 3 is an illustrative diagram of an interface (200) for configuring a product invocation framework. In FIG. 3, the upper section showing the integration module fields (232) is identical to the upper section illustrated in FIG. 2. In the lower section, the logical management operations tab (302) has been selected. This displays a number of fields providing information and configuration control of the LMO module.

According to one illustrative embodiment, the display includes a number of fields including a logical management operation name (304), a description field (306), a source object name (308), a response object name (310) and an invocation pattern type (312). The logical management operation name field (304) describes the specific logical management operation, 'Deploy.' The description field (306) briefly describes the logical management operation named in the logical management operation field (304). An icon (314) to the right of the description field (306) allows a user to enter an additional or alternative description. The source object field (308) identifies the source object that will be passed to the logical management operation module.

The response object field (310) identifies the response or target object that will be created or modified by the integration module prior to passing the response or target object to the process management product or other calling entity. The invocation pattern field (312) displays the expected pattern for the response by the operational management product. As discussed above, there are number of response patterns which could be used such as: 'synchronous,' 'asynchronous one-way,' 'asynchronous deferred response,' or 'asynchronous call back'.

Figure 4:
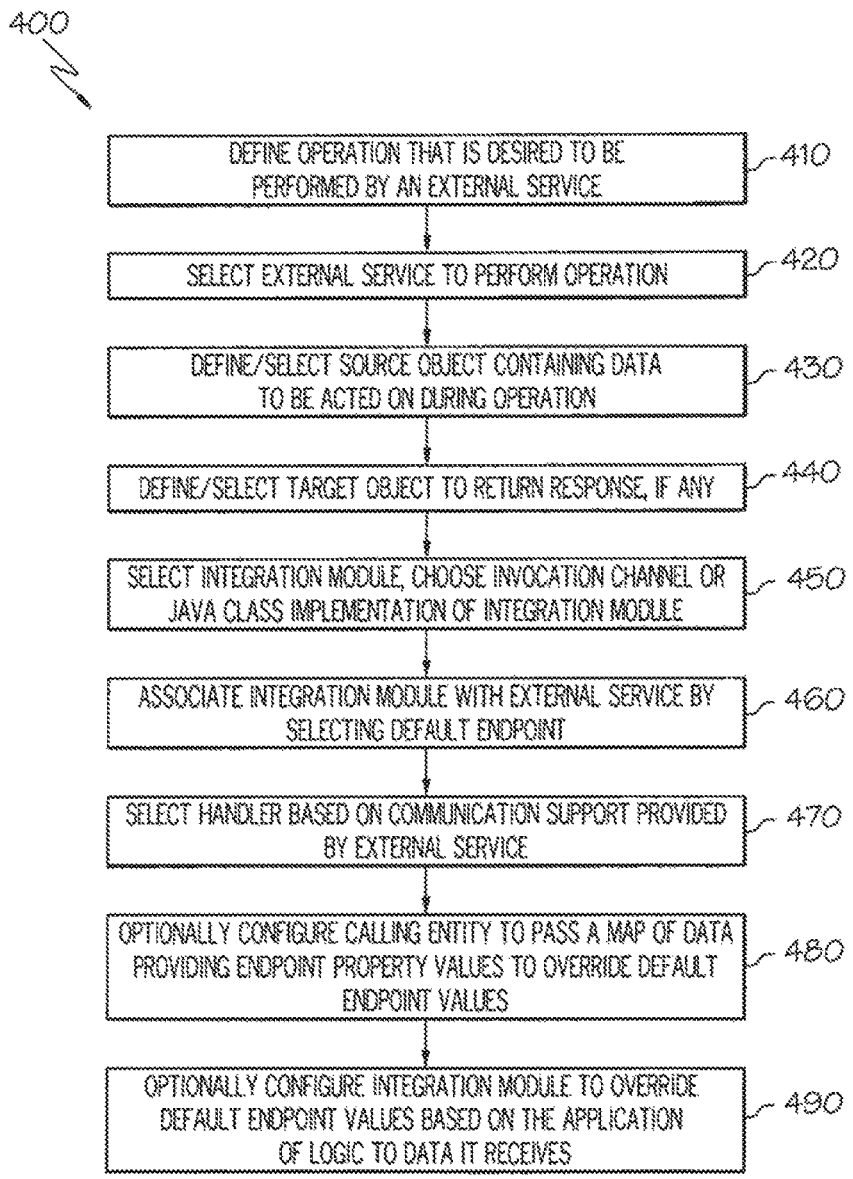
FIG. 4 is a flow chart showing one illustrative method for configuration of an integration framework, according to one embodiment of principles described herein.

FIG. 4 is a flowchart showing one illustrative method for configuration of an integration framework. In a first step, the user defines the operation that is to be performed by an external service (step 410). Following the identification of the operation, a suitable external service is selected to perform the operation (step 420).

The source object containing the data to be acted upon by the external service is then defined or selected (step 430). The desired response/target object is then defined or selected (step 440). The integration module that will bridge the gap between the calling entity and the selected external service is selected (step 450) and configured.

The configuration of the integration module may have any number of steps and operations, which can be performed in a variety of sequences. According to one illustrative embodiment, the invocation channel or a custom Java class implementation of the integration module is selected (step 450). The integration module is then associated with the external service by selecting a default endpoint (step 460). As discussed above, the default endpoint will be used to supply credentials and configuration data to a handler as it makes a connection to the external service. The handler is selected based on communication support provided by the external service (step 470). For example, if the external service supports a web services, HTTP, and JMS protocols, a handler that is configured to communicate through any one of those protocols could be selected.

In some embodiments, it can be desirable to override the default endpoint properties. The calling entity can be configured to pass a map of data which provides endpoint property values to override the default endpoint values (step 480). This allows the default endpoint values to be overridden at run time. Optionally, the integration module can be configured to override default endpoint values based on data it receives (step 490).

In sum, the product invocation framework bridges the format and communication differences between a calling entity and an external service. The product invocation framework allows for flexibility in the integration module design and provides a common/standard way for integration modules to be built and implemented. In one exemplary embodiment, the invocation framework and integration module can be designed using a graphical user interface. The modular nature of the invocation framework elements and the graphical user interface eliminates the need to write computer code when creating an invocation framework.

The invocation framework provides a standard approach for a process management product to call an integration module and pass data to the integration module using source objects. The source object is a versatile data structure that can be adapted to meet a wide variety of needs while simultaneously remaining compatible with one or more integration modules.

The invocation framework also provides a standard approach for the integration module to communicate with the external service or operational management product. The integration module uses a variety of endpoints to define the communication to various external services. The framework provides a variety of handlers for protocols such as HTTP, Web Service, Command Line. JMS and other protocols. The integration modules can be configured for use with any of the provided handlers. If an endpoint/handler is not available for a particular service, the endpoint/handler combination can be created. Additionally, the framework gives the integration module the capability to override configured endpoint parameters at run time. The framework can then set the endpoint parameters based on the data which is being processed. This flexibility in assembling an invocation framework allows a greater number of process management products to access a wider range of external services.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for remote product invocation comprising:
configuring an invocation framework, the invocation framework comprising an integration module and an endpoint/handler module;
wherein the integration module is configured to:
receive a source object;
format data from the source object based on requirements of a target machine supporting an external service that performs a desired operation;
utilize the endpoint/handler module, which comprises two distinct subcomponents, an endpoint and a handler, the endpoint to contain information for making a connection to an external service, and the handler to use the information from the endpoint to make connection to the external service and execute the desired operation using the data from the source object; and
with a logical management operation of the invocation framework, defining an action to be executed in response to receiving the source object so as to provide an interface between an entity submitting the source object to the integration module and the integration module.

2. The method of claim 1, wherein the logical management operation is compatible with a plurality of integration modules and a plurality of submitting entities.

3. The method of claim 1, wherein the configuring the invocation framework comprises selecting one of a custom executable code module and an invocation channel.

4. The method of claim 1, wherein the configuring the invocation framework comprises associating the integration module with the external service by selecting a default endpoint.

5. The method of claim 4, wherein the default endpoint is overridden at run time by passing appropriate data into the integration module.

6. The method of claim 4, wherein the default endpoint is overridden based on logic contained within the integration module, the logic operating on data received by the integration module.

7. The method of claim 1, wherein configuration of the invocation framework comprises selecting a handler based on communication capabilities of the external service.

8. The method of claim 1, further comprising, with the invocation framework, reformatting a response from the external service into a target object based on a format used by an entity submitting the source object and returning the target object to the entity submitting the source object.

9. The method of claim 1, wherein the configuration of the invocation framework is performed through graphical user interface with a user entering and selecting data rather than writing code.

10. The method of claim 1, wherein the invocation framework provides a standardized interface for communicating with external services.

11. A computer comprising a processor, memory and an interface for a product invocation framework for remote invocation of external services, the interface comprising:
an integration module, the integration module being configured to receive a source object from a calling entity, the source object containing data to be used during execution of a remote operation, the integration module being further configured to format data from the source object based on requirements of a target machine supporting an external service that performs a desired operation; and
an endpoint/handler which comprises two distinct subcomponents, an endpoint and a handler, the endpoint to contain information for making a connection to the external service, and the handler to use the information from the endpoint to make connection to the external service and execute the desired operation using the data from the source object;
wherein the interface further comprises a logical management operation, the logical management operation defining an action to be executed in response to receiving the source object so as to provide an interface between the calling entity submitting the source object to the integration module and the integration module.

12. The computer of claim 11, wherein the integration module comprises two alternative data paths, the two alternative data paths comprising a custom Java Class and an invocation channel.

13. The computer of claim 11, wherein the integration module is configured to alter a configuration of the endpoint/handler in response to data received by the integration module.

14. The computer of claim 11, wherein the integration module is assembled from a plurality of modular components using a codeless process.

15. A method for remote product invocation comprising:
configuring an invocation framework, the invocation framework comprising an integration module and an endpoint/handler module;
wherein the integration module is configured to:
receive a source object;

format data from the source object for a desired operation; and utilize the endpoint/handler module to make a connection to an external service that executes the desired operation using the data from the source object; and, with a logical management operation of the invocation framework, defining an action to be executed in response to receiving the source object so as to provide an interface between an entity submitting the source object to the integration module and the integration module.

16. The method of claim 15, further comprising prompting a user to input configuration details to configure said invocation framework and integration module.

17. The method of claim 15, wherein configuring said invocation framework comprises selecting one of a custom executable code module and an invocation channel.

18. The method of claim 15, wherein configuring said invocation framework comprises associating said integration module with said external service by selecting a default endpoint.

19. The method of claim 15, wherein the logical management operation is compatible with a plurality of integration modules and a plurality of submitting entities.

20. The method of claim 15, wherein configuration of the invocation framework comprises selecting a handler based on communication capabilities of the external service.

* * * * *